United States Patent
Jiang et al.

(10) Patent No.: US 10,380,398 B2
(45) Date of Patent: Aug. 13, 2019

(54) SYSTEMS AND METHODS FOR CONTROLLING FINGERPRINT AUTHENTICATION

(71) Applicant: Beijing Xiaomi Mobile Software Co., Ltd., Haidian District, Beijing (CN)

(72) Inventors: Zhongsheng Jiang, Beijing (CN); Dan Liu, Beijing (CN); Gang Wang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 209 days.

(21) Appl. No.: 15/482,222

(22) Filed: Apr. 7, 2017

(65) Prior Publication Data
US 2017/0351896 A1 Dec. 7, 2017

(30) Foreign Application Priority Data
Jun. 3, 2016 (CN) .......................... 2016 1 0391360

(51) Int. Cl.
G06K 9/00 (2006.01)
G06F 21/32 (2013.01)

(52) U.S. Cl.
CPC ........... G06K 9/0002 (2013.01); G06F 21/32 (2013.01)

(58) Field of Classification Search
CPC ........... G06K 9/00073; G06K 9/00006; G06K 9/036; G06K 9/0008; G06K 9/00093; G06K 9/001; G06K 9/00744; G06K 19/0718; G06T 7/33
See application file for complete search history.

(56) References Cited

U.S. PATENT DOCUMENTS

| 5,781,651 A * | 7/1998 | Hsiao ................. G07C 9/00158 382/127 |
| 9,560,042 B2 * | 1/2017 | Okazaki ............... G06F 1/1616 |
| 9,710,691 B1 * | 7/2017 | Hatcher ............ G06K 9/00033 |
| 9,842,245 B1 * | 12/2017 | Setterberg ........... G06K 9/0012 |

(Continued)

FOREIGN PATENT DOCUMENTS

| CN | 105224139 A | 1/2016 |
| CN | 105260105 A | 1/2016 |

(Continued)

OTHER PUBLICATIONS

Method for seamless Unlock Function for Mobile Applications, Ihor Vasyltsov et al., IEEE, 978-1-4577-0220-4, 2016, pp. 2614- 2617 (Year: 2016).*

(Continued)

Primary Examiner — Jayesh A Patel
(74) Attorney, Agent, or Firm — Arch & Lake LLP

(57) ABSTRACT

Electronic devices having fingerprint authentication, and methods for controlling a fingerprint authentication on the electronic devices are provided. In one aspect, a method includes acquiring, using a first sensor on the electronic device, a first signal produced by an object positioned in proximity to the electronic device, and acquiring a second signal using a fingerprint sensor on the electronic device. The method also includes controlling a fingerprint authentication on the electronic device based on at least one of the first signal and the second signal.

15 Claims, 6 Drawing Sheets

(56) References Cited

U.S. PATENT DOCUMENTS

| | | | |
|---|---|---|---|
| 2004/0068669 A1* | 4/2004 | Uchida | G06K 9/00067 726/5 |
| 2007/0290124 A1* | 12/2007 | Neil | G06K 9/00013 250/221 |
| 2012/0019356 A1* | 1/2012 | Gagneraud | G06F 21/32 340/5.32 |
| 2014/0133710 A1* | 5/2014 | Hama | G06K 9/00087 382/115 |
| 2015/0103034 A1* | 4/2015 | Shepelev | G06F 3/0416 345/174 |
| 2015/0126246 A1 | 5/2015 | Lombardi et al. | |
| 2016/0140379 A1* | 5/2016 | Pedersen | G06K 9/00919 726/19 |
| 2016/0370875 A1* | 12/2016 | Lee | G06F 3/0202 |
| 2017/0010705 A1 | 1/2017 | Lombardi et al. | |
| 2017/0154198 A1 | 6/2017 | Li et al. | |
| 2017/0364763 A1* | 12/2017 | Jin | G06K 9/0002 |
| 2018/0276440 A1* | 9/2018 | Strohmann | G06K 9/0002 |

FOREIGN PATENT DOCUMENTS

| | | | | |
|---|---|---|---|---|
| CN | 105278655 A | 1/2016 | | |
| CN | 105488464 A | 4/2016 | | |
| WO | WO-2009008686 A2 * | 1/2009 | | G06F 3/0234 |
| WO | 2016080761 A1 | 5/2016 | | |

OTHER PUBLICATIONS

Supplementary European Search Report in European application No. 17163439.7, dated Oct. 4, 2017, 7 pages.

Chinese First Office Action dated May 18, 2018 for corresponding CN Patent Application No. 201610391360.8, including English translation, 29 pages.

* cited by examiner

SYSTEMS AND METHODS FOR CONTROLLING FINGERPRINT AUTHENTICATION

CROSS-REFERENCE TO RELATED APPLICATION

This application is filed based upon and claims priority to Chinese Patent Application No. 201610391360.8, filed on Jun. 3, 2016, the entire contents of which are incorporated herein by reference.

TECHNICAL FIELD

The present disclosure generally relates to biometric technologies, and more particularly, to methods and devices implementing fingerprint authentication.

BACKGROUND

As technology has progressed, biometric features are increasingly being used in consumer electronics for user identification and customized usage. In particular, fingerprint authentication has been added to smartphones, tablets and other devices, to increase security and avoid the trouble of inputting an authentication password by a user via keyboard or touchscreen. In fingerprint authentication, the fingerprint of a user is acquired through a fingerprint sensor, and when a similarity between the acquired fingerprint and a stored reference fingerprint reaches a preset threshold value, the device is unlocked. On the other hand, when the similarity does not reach the preset threshold value, fingerprint unlocking fails, and the device may record an unlocking failure. When fingerprint authentication produces multiple unlocking failures, the device may be disabled, and, in some cases, data erasing measures may also be initiated. In particular, portable devices, such as cell phones or smartphones, may initiate fingerprint authentication a number of times while being carried in a pocket, or while being positioned in a manner that activates the fingerprint sensor. Inevitably, this will result in a number of unlocking failures, which can lead to undesirable data erasure or lockout, or at the very least will unnecessarily increase battery consumption. Therefore, there is a need for improved methods directed to fingerprint authentication.

SUMMARY

The present disclosure provides a novel approach for controlling electronic devices having biometric capabilities, such as fingerprint authentication capabilities, which overcomes the drawbacks of aforementioned technologies.

In one aspect of the disclosure, a method for controlling a fingerprint authentication on an electronic device is provided. The method includes acquiring, using a first sensor on the electronic device, a first signal produced by an object positioned in proximity to the electronic device, and acquiring a second signal using a fingerprint sensor on the electronic device. The method also includes controlling a fingerprint authentication on the electronic device based on at least one of the first signal and the second signal.

In another aspect of the disclosure, an electronic device having a fingerprint authentication is provided. The electronic device includes a first sensor configured to acquire signals from objects near the electronic device, and a fingerprint sensor configured to acquire a user fingerprint. The electronic device also includes a processor programmed to execute instructions stored in a memory to receive a first signal produced by an object near the electronic device and acquired using the first sensor. The processor is also programmed to receive a second signal acquired using the fingerprint sensor on the electronic device. The processor is further programmed to control a fingerprint authentication on the electronic device based on at least one of the first signal and the second signal.

In yet another aspect of the disclosure, a non-transitory computer-readable storage medium is provided. The non-transitory computer-readable storage medium includes stored therein instructions that, when executed by a processor, causes the processor to perform a method for controlling a fingerprint authentication. The method includes acquiring, using a first sensor on the electronic device, a first signal produced by an object positioned in proximity to the electronic device, and acquiring a second signal using a fingerprint sensor on the electronic device. The method also includes controlling a fingerprint authentication on the electronic device based on at least one of the first signal and the second signal.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of example embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1A:
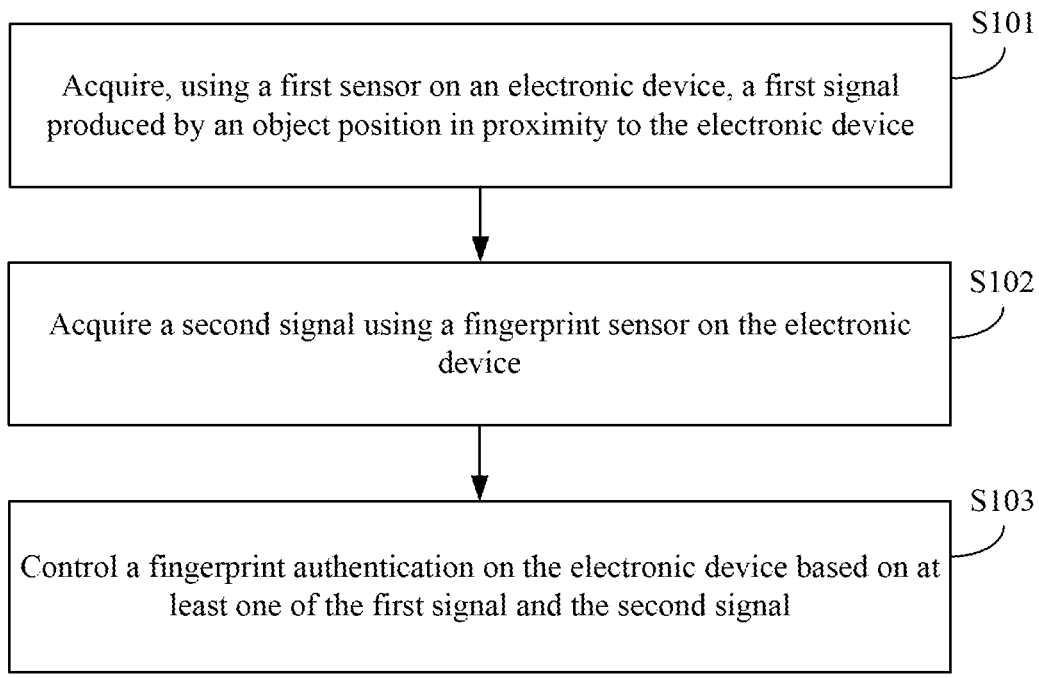
FIG. 1A is a flowchart setting forth steps of a process for fingerprint authentication, in accordance with aspects of the present disclosure.

Turning now to FIG. 1A, steps of a process for controlling a fingerprint authentication on an electronic device, or carrying out a fingerprint unlocking, are shown. As shown, the process may begin at step S101 with acquiring, using at least one sensor on the electronic device, one or more signals produced by an object positioned in proximity to the electronic device, such as an object hovering over or placed next to the device. The object may include a finger, a palm, a face, and so forth, as well as clothing, or other objects or articles. The signals may be indicative of the proximity or distance between the object and the electronic device. In some aspects, the electronic device may include a first sensor and a second sensor. A first signal may be acquired using the first sensor, which may include a proximity sensor. In addition, the first signal may include signals produced by a touch-screen, button, or other input sensors. As such, the first sensor may include any such input sensors, and the first signal may be based on measured currents, voltages, light, capacitances, impedances and other quantities. In some aspects, the first signal may be a combination of signals measured using different sensors, the contributions of each of the signals being weighted using various weights.

The process may then continue with step S102 by acquiring a second signal using the second sensor on the electronic device, which may be a fingerprint sensor. Steps S101 and S102 may be carried out sequentially or substantially concurrently. In some aspects, step S102 may be executed based on a condition satisfied by first signal. For instance, step S102 may be executed based on a strength of the first signal relative to a preset threshold or preset threshold value. As such, the strength of the first signal and/or the second signal may be determined at respective steps S101 and S102. For instance, the strength of the first signal may be determined based on a determined distance between the object and the electronic device, or based on a sensing area of a touch-screen activated by the object, or both. Similarly, the strength of the second signal may be determined based on signals measured by the second sensor, such as current signals, voltage signals, capacitance signals, light signals, impedance signals and others.

A fingerprint authentication on the electronic device may then be controlled based the first signal, the second signal, or both, as indicated by S103. In some aspects, execution of a fingerprint unlocking function on the electronic device may be controlled by comparing the strength of the first signal to a first preset threshold, or the strength of the second signal to a second preset threshold, or both. For instance, a fingerprint unlocking function may be executed when the strength of the first signal is smaller than or equal to the first preset threshold, or when the strength of the second signal is larger than or equal to the second preset threshold, or both.

In addition, operation of a display screen on the electric device may also be controlled at step S103 based on the first signal and second signal. For instance, activation of the display screen may be prevented when the strength of the first signal is larger than the first preset threshold, or when the strength of the second signal is smaller than the second preset threshold, or both. Alternatively, the display screen may be activated when the strength of the first signal is smaller than or equal to the first preset threshold, or when the strength of the second signal is larger than or equal to the second preset threshold, or both.

In some aspects, it may be determined whether the second signal is a fingerprint signal. This may be achieved by comparing voltage, current, capacitance, or other signals, or signal characteristics associated with the second signal to a preset fingerprint profile. To this end, a similarity between such signals or signal characteristics and those associated with the preset fingerprint profile may be evaluated. For example, voltage signals associated with the second signal may be compared to voltage signals associated with at least one characteristic point in the preset fingerprint profile. When the second signal is not found to be a fingerprint signal, the electronic device controlled to enter an inadvertent touch rejection mode, for example. Other functions or modes may be activated based on the determination that the second signal is a not fingerprint signal.

Figure 1B:
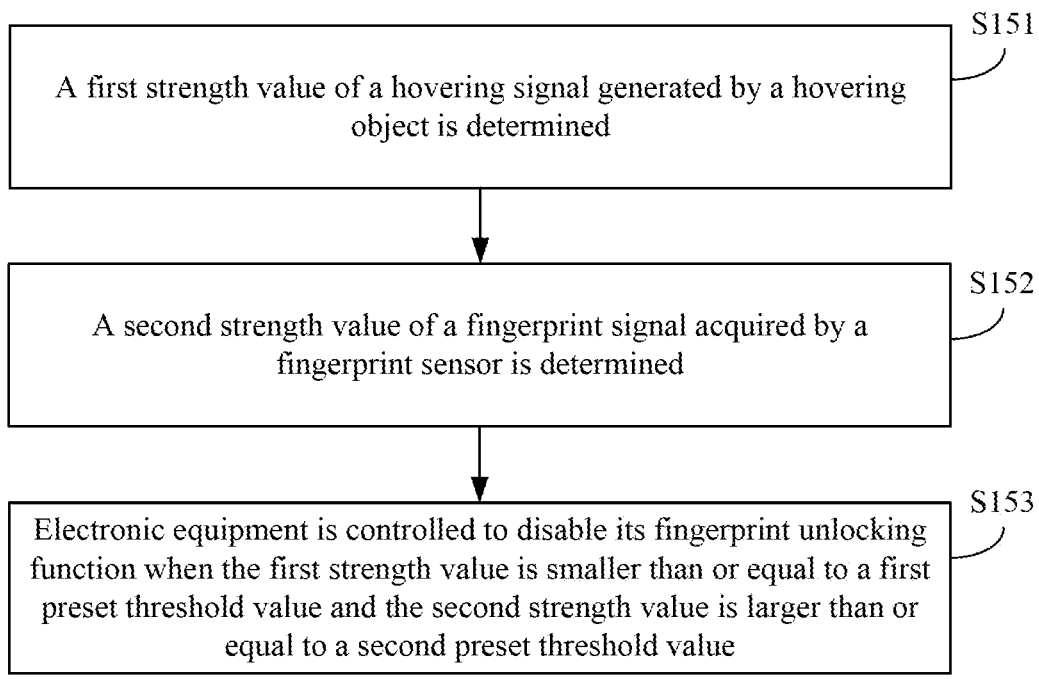
FIG. 1B is another a flowchart setting forth steps of a process for fingerprint authentication, in accordance with aspects of the present disclosure.
Figure 1C:
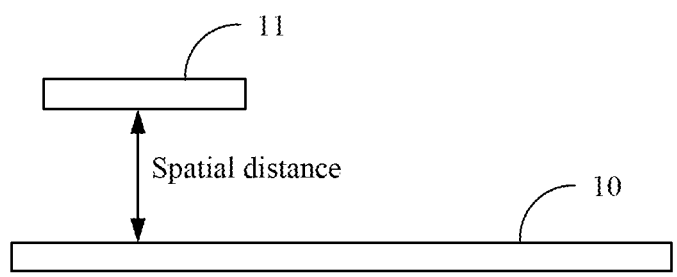
FIG. 1C is a schematic diagram illustrating an aspect of fingerprint authentication, in accordance with the present disclosure.

FIG. 1B is a flowchart showing a method for implementing fingerprint unlocking according to an exemplary embodiment, and FIG. 1C is a scenario diagram of a method for implementing fingerprint unlocking according to an exemplary embodiment. The method for implementing fingerprint unlocking may be applied to electronic equipment or devices (for example, devices with a touch function such as a smartphone, tablet or laptop computer). As shown in FIG. 1B, the method for implementing fingerprint unlocking includes the following Step S151-S153.

Step S151: a first strength value of a hovering signal generated by a hovering object is determined;

Step S152: a second strength value of a fingerprint signal acquired by a fingerprint sensor is determined; and Step S153: electronic equipment or device is controlled to disable its fingerprint unlocking function when the first strength value is larger than a first preset threshold value and the second strength value is smaller than a second preset threshold value.

In Step S151, in an embodiment, the hovering object may be a face, finger, clothes and the like of a user. In an embodiment, the first strength value of the hovering signal may be determined by a distance between a proximity sensor and the hovering object and a sensed area of the hovering object on a touch screen. The shorter the distance measured, the greater the strength of the hovering signal, and similarly the larger the sensed area, the greater the strength of the hovering signal. In an embodiment, a value of a current strength in an XY plane of the proximity sensor may be determined according to a value of a current sensed by the proximity sensor and the sensed area. A distance value in a Z-axis direction of the proximity sensor is sensed through the proximity sensor. Different weights may be set according to degrees of influence of the value of the current strength, for example, and the distance value on the hovering signal, and the first strength value of the hovering signal generated by the hovering object is obtained by weighting the value of the current strength and the distance value with their respective weights.

In Step S152, in an embodiment, the second strength value of the fingerprint signal acquired by the fingerprint sensor may be determined by virtue of various commercially available fingerprint acquisition technologies.

In Step S153, in an embodiment, the first preset threshold value may be set according to sensitivity of the proximity sensor and the touch screen. The second preset threshold value may be set according to sensitivity of the fingerprint sensor. The specific values of the first preset threshold value and the second preset threshold value are not limited in the present disclosure.

In one exemplary scenario, when the user puts the electronic equipment in a pocket, the proximity sensor may detect that the hovering object 11 (which may be the clothes of the user or skin of a human body at this moment) hovers over the touch screen 10 of the electronic equipment, the hovering object 11 may be kept at a tiny spatial distance (for example, 10 millimeters) away from the touch screen 10. The electronic equipment determines the first strength value of the hovering signal generated by the hovering object 11 by virtue of a distance sensing function of the proximity sensor and an area sensing function of the touch screen. The fingerprint sensor of the electronic equipment may acquire the fingerprint signal due to friction with the clothes. The fingerprint signal corresponds to the second strength value. When the first strength value is very large (for example, the first strength value is larger than the first preset threshold value) because of covering of the clothes, the fingerprint sensor may acquire a voltage signal due to friction with the clothes or contact with the skin. The fingerprint sensor may identify the voltage signal as a fingerprint signal. In accordance with aspects of the present disclosure, the electronic equipment may be controlled to disable the fingerprint unlocking function when the first strength value is larger than the first preset threshold value and/or the second strength value is smaller than the second preset threshold value. In this manner, the electronic equipment may be prevented from triggering the subsequent fingerprint unlocking function.

The electronic equipment may acquire the voltage signal due to friction with the clothes or contact with the skin, and the fingerprint sensor may identify the voltage signal as a fingerprint signal. As a result, the electronic equipment may be controlled to disable the fingerprint unlocking function when the first strength value is larger than the first preset threshold value and/or the second strength value is smaller than the second preset threshold value. In such a manner, the electronic equipment may be prevented from triggering fingerprint identification and performing fingerprint matching when being covered by an obstruction. As a result, the electronic equipment is prevented from enabling the fingerprint unlocking function even under a condition of inadvertent touch on the fingerprint sensor. This allows for a reduction in the number of times that the fingerprint unlocking function of the electronic equipment is enabled, and ensures normal use of the electronic equipment.

In an embodiment, the method may further include that: a display screen of the electronic equipment is controlled to be kept in an off state when the first strength value is larger than the first preset threshold value and/or the second strength value is smaller than the second preset threshold value.

In an embodiment, the method may further include that: the electronic equipment is controlled to enable the fingerprint unlocking function when the first strength value is smaller than or equal to the first preset threshold value and the second strength value is larger than or equal to the second preset threshold value; and the display screen of the electronic equipment is controlled to switch from the off state to an on state.

In an embodiment, the method may further include that: the electronic equipment is controlled to disable a proximity sensing function for the hovering object when the first strength value is larger than the first preset threshold value and/or the second strength value is smaller than the second preset threshold value.

In an embodiment, the method may further include that: a voltage signal acquired by the fingerprint sensor and subjected to analogue-to-digital processing is determined. It is determined whether the voltage signal is a fingerprint signal. When the voltage signal is a fingerprint signal, the step that the second strength value of the fingerprint signal acquired by the fingerprint sensor is determined is executed. The electronic equipment is controlled to enter an inadvertent touch rejection mode when the voltage signal is not a fingerprint signal.

In an embodiment, the step that the first strength of the hovering signal generated by the hovering object is determined may include that: a distance, sensed by a proximity sensor, from the hovering object and a sensed area of the hovering object on a touch screen are determined. The first strength of the hovering signal generated by the hovering object is determined according to the distance and the sensed area.

Specifically how to implement fingerprint unlocking refers to a subsequent embodiment.

At this point, according to the abovementioned methods, electronic equipment may be prevented from triggering fingerprint authentication or identification and performing fingerprint matching when being covered by an obstruction. As mentioned, this prevents electronic equipment from enabling or activating the fingerprint unlocking function even under the condition of inadvertent touch on the fingerprint sensor. As a result, battery resources may be conserved, as well as undesired device lockout averted.

The technical solution provided by the embodiment of the present disclosure will be described below with a specific embodiment.

Figure 2:
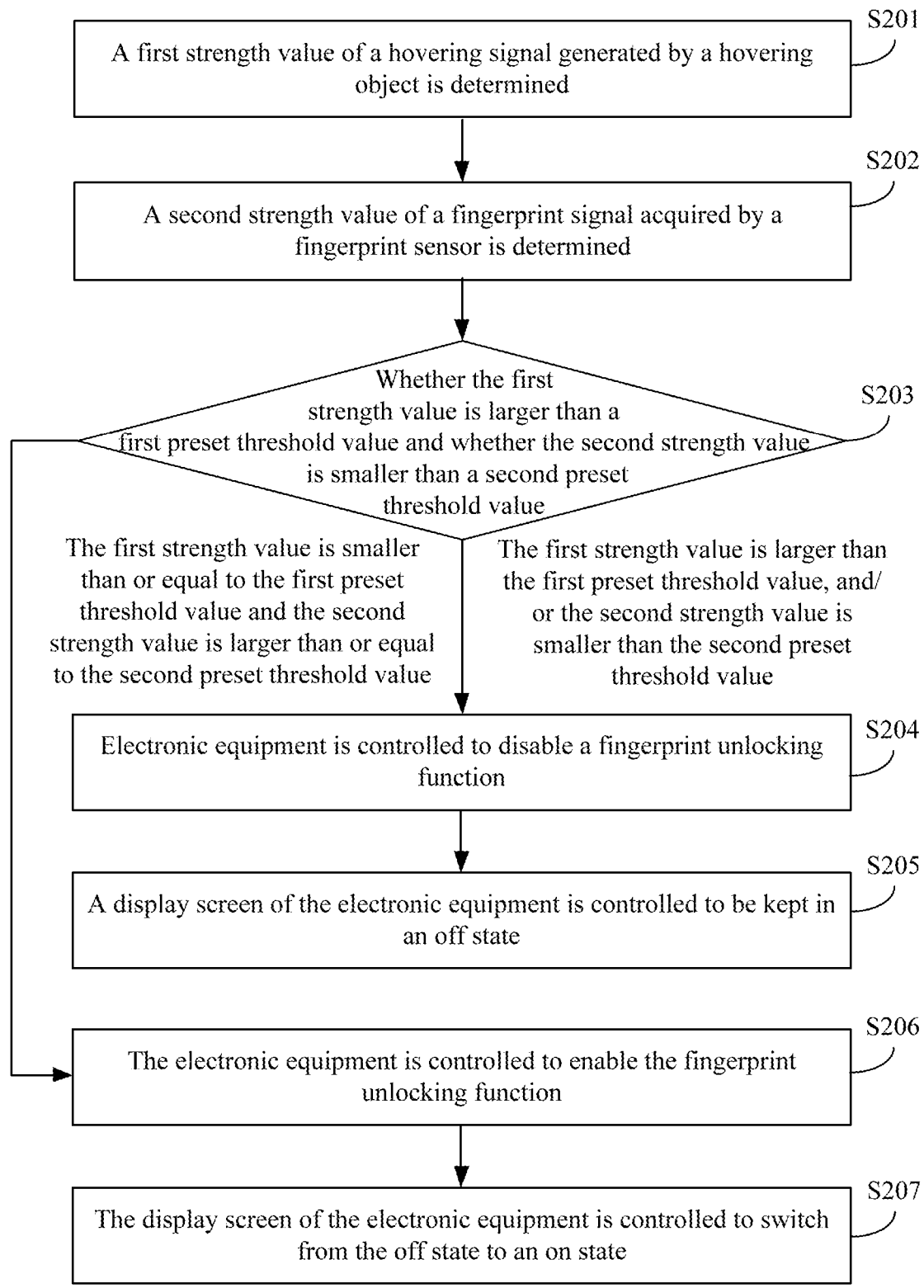
FIG. 2 is yet another a flowchart setting forth steps of a process for fingerprint authentication, in accordance with aspects of the present disclosure.

FIG. 2 is a flowchart showing a method for implementing fingerprint unlocking according to exemplary embodiment 1. As shown, the method includes the following steps.

Step S201: a first strength value of a hovering signal generated by a hovering object is determined;

Step S202: a second strength value of a fingerprint signal acquired by a fingerprint sensor is determined;

Step S203: it is determined whether the first strength value is larger than a first preset threshold value and whether the second strength value is smaller than a second preset threshold value, Step S204 is executed when the first strength value is larger than the first preset threshold value and/or the second strength value is smaller than the second preset threshold value, and Step S206 is executed when the first strength value is smaller than or equal to the first preset threshold value and the second strength value is larger than or equal to the second preset threshold value;

Step S204: electronic equipment or device is controlled to disable its fingerprint unlocking function;

Step S205: a display screen of the electronic equipment is controlled to be kept in an off state, and a flow is ended;

Step S206: the electronic equipment is controlled to enable the fingerprint unlocking function; and Step S207: the display screen of the electronic equipment is controlled to switch from the off state to an on state, and the flow is ended.

Descriptions about Step S201 and Step S202 may refer to related descriptions in the embodiment shown in FIGS. 1A and 1B, and will not be elaborated herein.

In Step S204-Step S206, in an embodiment, states of the fingerprint unlocking function, the display screen and a proximity sensing function may be controlled through an operating system of the electronic equipment, for example, enabling or disabling of the fingerprint unlocking function, the on state or off state of the display screen, and enabling or disabling of the proximity sensing function.

The abovementioned methods flow is only an exemplary description, and an execution sequence of the abovementioned steps will not be limited. In an embodiment, the first strength value may be detected by virtue of the proximity sensing function of a proximity sensor, the fingerprint unlocking function is enabled when the first strength value does not reach the first preset threshold value, and on the contrary, the fingerprint unlocking function is disabled if the first strength value reaches the first preset threshold value. For example, the electronic equipment is put in a pocket, the first strength value of the hovering signal may be determined by combining the proximity sensing function of the proximity sensor and a touch area sensing function of a touch screen, the first strength value is larger than the first preset threshold value, and under such a condition, the fingerprint unlocking function may be disabled through the operating system of the electronic equipment, thereby reducing power consumption of the electronic equipment.

In another embodiment, the fingerprint signal may be acquired by the fingerprint sensor, the proximity sensing function of the proximity sensor is enabled when the second strength value of the fingerprint signal reaches the second preset threshold value, the fingerprint unlocking function is enabled when the first strength value of the hovering signal detected by the proximity sensor is smaller than the first preset threshold value, the fingerprint unlocking function is disabled when the first strength value is larger than or equal to the first preset threshold value, and the proximity sensing function of the proximity sensor is disabled when the second strength value of the fingerprint signal does not reach the second preset threshold value. For example, the electronic equipment contacts with skin of a human body, and the fingerprint sensor may determine an acquired voltage signal generated by non-fingerprint skin as a fingerprint signal, thereby triggering a fingerprint unlocking flow. In the embodiment, under the condition that the second strength value of the fingerprint signal is determined not to reach the second preset threshold value, the electronic equipment may be controlled to disable the proximity sensing function for the hovering object, thereby reducing power consumption of the electronic equipment.

The embodiment has the beneficial technical effects of the abovementioned embodiment, and on such a basis, the proximity sensing function of the proximity sensor and a fingerprint detection function of the fingerprint sensor are combined to implement enabling or disabling of the fingerprint unlocking function, so that corresponding functions which are unneeded may be disabled to reduce the power consumption of the electronic equipment.

Figure 3:
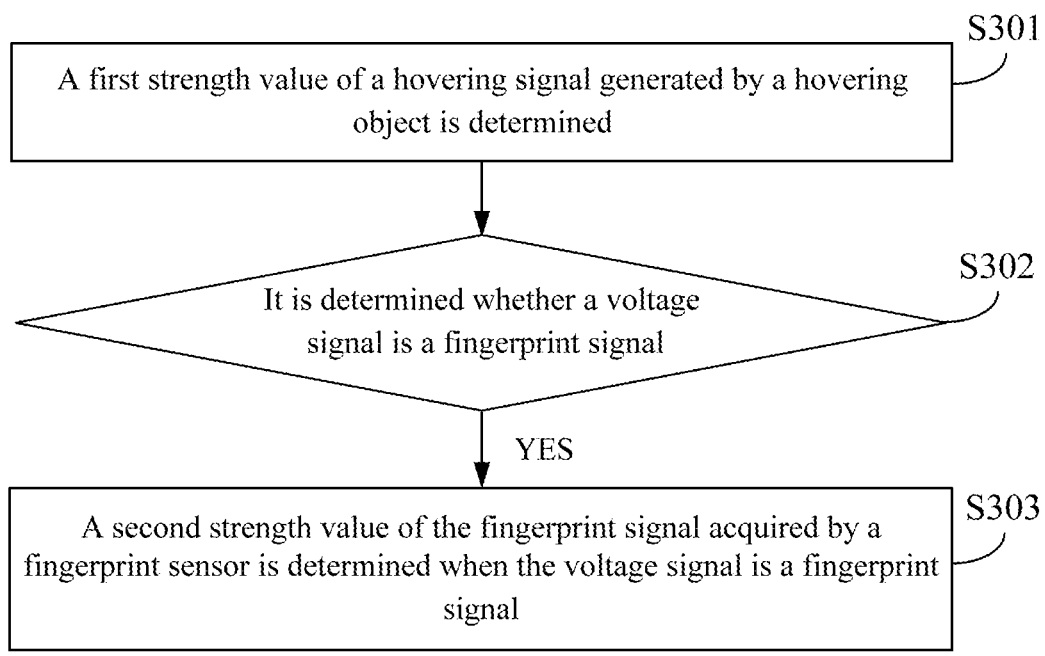
FIG. 3 is yet another a flowchart setting forth steps of a process for fingerprint authentication, in accordance with aspects of the present disclosure.

FIG. 3 is a flowchart showing a method for implementing fingerprint unlocking according to exemplary embodiment 2. As shown, the method includes the following steps:

Step S301: a voltage signal acquired by a fingerprint sensor and subjected to analogue-to-digital processing is determined;

Step S302: it is determined whether the voltage signal is a fingerprint signal, Step S303 is executed when the voltage signal is a fingerprint signal, and electronic equipment may be directly controlled to enter an inadvertent touch rejection mode when the voltage signal is not a fingerprint signal; and Step S303: a second strength value of the fingerprint signal acquired by the fingerprint sensor is determined when the voltage signal is a fingerprint signal.

In order to ensure that the voltage signal acquired by the fingerprint sensor is a real fingerprint signal, in an embodiment, the voltage signal acquired by the fingerprint sensor may be compared with a preset fingerprint characteristic point, and when the voltage signal does not include a preset fingerprint characteristic, the electronic equipment is controlled to enter the inadvertent touch rejection mode, thereby avoiding the electronic equipment executing an unnecessary operation in case of inadvertent touch. For example, the electronic equipment contacts with skin of a human body, the fingerprint sensor may determine an acquired voltage signal generated by non-fingerprint skin as a fingerprint signal, and since distribution of the voltage signal is inconsistent with a distribution characteristic of characteristic points in the fingerprint signal, under such a condition, it can be considered that the electronic equipment is inadvertently touched, and the electronic equipment may be prevented from executing the unnecessary operation by controlling the electronic equipment to enter the inadvertent touch rejection mode. In an embodiment, the preset fingerprint characteristic point may be a characteristic point such as a breakpoint, bifurcation point and turning point of a fingerprint.

In the embodiment, the second strength value of the fingerprint signal acquired by the fingerprint sensor is further determined only after the voltage signal is determined to be a fingerprint signal, so that the electronic equipment is prevented from performing a subsequent unnecessary operation, and power consumption of the electronic equipment is reduced.

Figure 4:
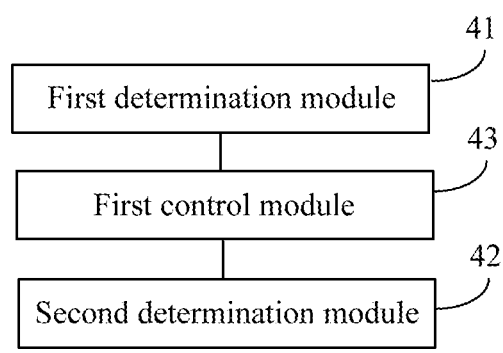
FIG. 4 is a block diagram of an electronic device having fingerprint authentication, in accordance with aspects of the present disclosure.

FIG. 4 is a block diagram of a device for implementing fingerprint unlocking according to an exemplary embodiment. As shown in FIG. 4, the device for implementing fingerprint unlocking includes: a first determination module 41, a second determination module 42, and a first control module 43.

The first determination module 41 is configured to determine a first strength value of a hovering signal generated by a hovering object. The second determination module 42 is configured to determine a second strength value of a fingerprint signal acquired by a fingerprint sensor. The first control module 43 is configured to control electronic equipment to disable its fingerprint unlocking function when the first strength value determined by the first determination module 41 is larger than a first preset threshold value and/or the second strength value determined by the second determination module 42 is smaller than a second preset threshold value.

Figure 5:
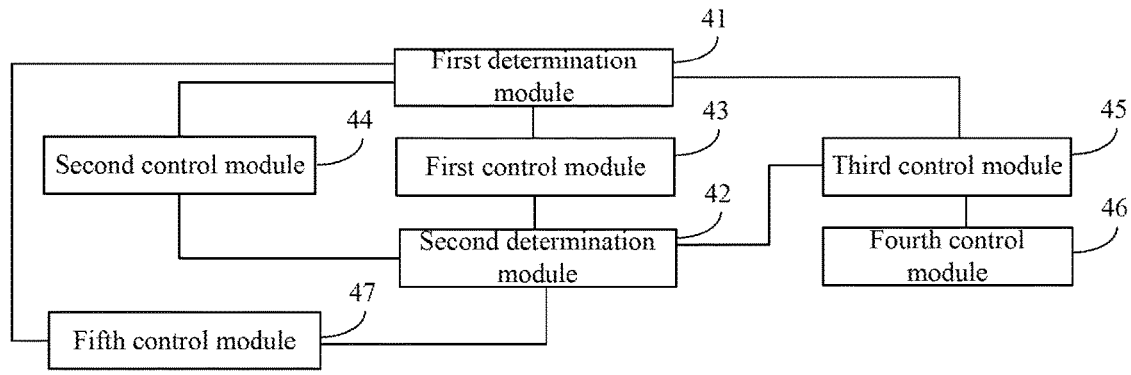
FIG. 5 is a block diagram of an electronic device having fingerprint authentication, in accordance with aspects of the present disclosure.

FIG. 5 is a block diagram of another device for implementing fingerprint unlocking according to an exemplary embodiment. As shown in FIG. 5, on the basis of the embodiment shown in FIG. 4, in an embodiment, the device may further include:

a second control module 44, configured to control a display screen of the electronic equipment to be kept in an off state when the first strength value determined by the first determination module 41 is larger than the first preset threshold value and/or the second strength value determined by the second determination module 42 is smaller than the second preset threshold value.

In an embodiment, the device may further include:

a third control module 45, configured to control the electronic equipment to enable the fingerprint unlocking function when the first strength value determined by the first determination module 41 is smaller than or equal to the first preset threshold value and the second strength value determined by the second determination module 42 is larger than or equal to the second preset threshold value; and a fourth control module 46, configured to control the display screen of the electronic equipment to switch from the off state to an on state.

In an embodiment, the device may further include: a fifth control module 47, configured to control the electronic equipment to disable a proximity sensing function for the hovering object when the first strength value determined by the first determination module 41 is larger than the first preset threshold value and/or the second strength value determined by the second determination module 42 is smaller than the second preset threshold value.

Figure 6:
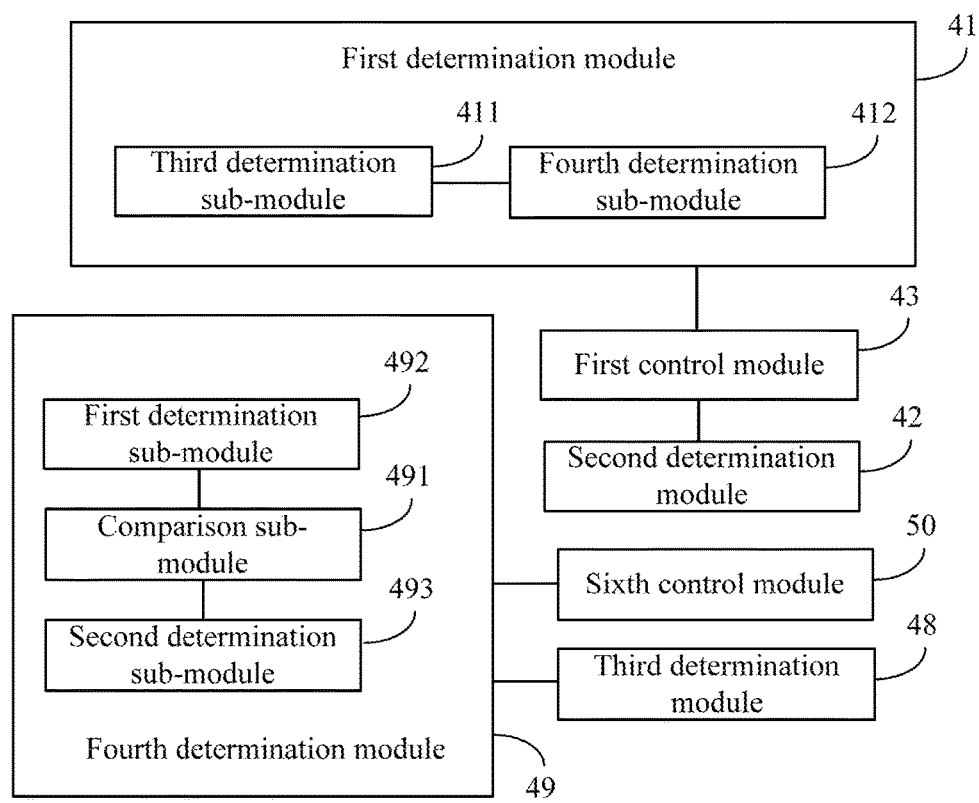
FIG. 6 is a block diagram of another device for implementing fingerprint unlocking according to an exemplary embodiment.

FIG. 6 is a block diagram of another device for implementing fingerprint unlocking according to an exemplary embodiment. As shown in FIG. 6, on the basis of the embodiment shown in FIG. 4 or FIG. 5, in an embodiment, the device may further include:

a third determination module 48, configured to determine a voltage signal acquired by the fingerprint sensor and subjected to analogue-to-digital processing;

a fourth determination module 49, configured to determine whether the voltage signal determined by the third determination module 48 is a fingerprint signal, the second determination module 42 executing the step of determining the second strength value of the fingerprint signal acquired by the fingerprint sensor when the fourth determination module 49 determines that the voltage signal is a fingerprint signal; and a sixth control module 50, configured to control the electronic equipment to enter an inadvertent touch rejection mode when the fourth determination module 49 determines that the voltage signal is not a fingerprint signal.

In an embodiment, the fourth determination module 49 may include: a comparison sub-module 491, a first determination sub-module 492, and a second determination sub-module 493. The comparison sub-module 491 is configured to compare the voltage signal with a preset fingerprint characteristic point to obtain a comparison result.

The first determination sub-module 492 is configured to determine that the voltage signal is a non-fingerprint signal when the comparison result obtained by the comparison sub-module 491 indicates that the voltage signal does not include the preset fingerprint characteristic point. The second determination sub-module 493 is configured to determine that the voltage signal is a fingerprint signal when the comparison result obtained by the comparison sub-module 491 indicates that the voltage signal includes the preset fingerprint characteristic point.

In an embodiment, the first determination module 41 may include: a third determination sub-module 411 and a fourth determination sub-module 412. The third determination sub-module 411 is configured to determine a distance, sensed by a proximity sensor, from the hovering object and a sensed area of the hovering object on a touch screen. The fourth determination sub-module 412 is configured to determine the first strength of the hovering signal generated by the hovering object according to the distance and sensed area determined by the third determination sub-module 411.

With respect to the devices in the above embodiments, the specific manners for performing operations for individual modules therein have been described in detail in the embodiments regarding the methods, which will not be elaborated herein.

Figure 7:
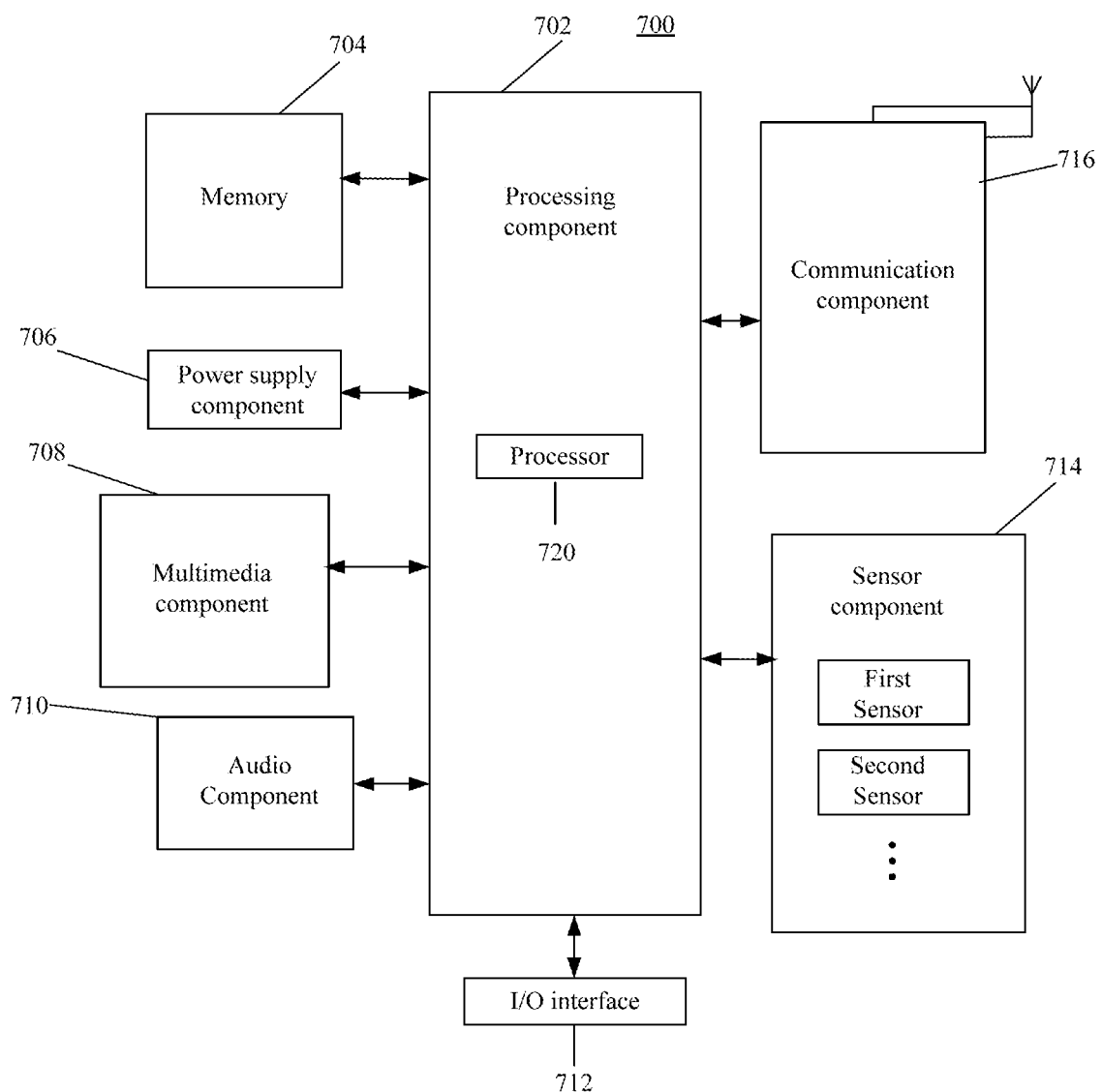
FIG. 7 is a block diagram of a device applicable to implementation of fingerprint unlocking according to an exemplary embodiment.

FIG. 7 is a block diagram of a device applicable to implementation of fingerprint unlocking according to an exemplary embodiment. For example, the device 700 may be a mobile phone, a laptop or personal computer, a digital broadcast terminal, a messaging device, a gaming console, a tablet, a medical device, exercise equipment, a personal digital assistant and the like.

Referring to FIG. 7, the device 700 may include one or more of the following components: a processing component 702, a memory 704, a power supply component 706, a multimedia component 708, an audio component 710, an Input/Output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the abovementioned method. Moreover, the processing component 702 may include one or more modules which facilitate interaction between the processing component 702 and the other components. For instance, the processing component 702 may include a multimedia module to facilitate interaction between the multimedia component 708 and the processing component 702.

The memory 704 is configured to store various types of data to support the operation of the device 700. Examples of such data include instructions for any application programs or methods operated on the device 700, contact data, phonebook data, messages, pictures, video, etc. The memory 704 may be implemented by any type of volatile or non-volatile memory elements or devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk. The power supply component 706 provides power for various components of the device 700. The power supply component 706 may include a power management system, one or more power supplies, and other components associated with the generation, management and distribution of power for the device 700.

The multimedia component 708 includes a display screen providing an output interface between the device 700 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 708 includes a front camera and/or a rear camera. The front camera and/or the rear camera may receive external multimedia data when the device 700 is in an operation mode, such as a photographing mode or a video mode. Each of the front camera and the rear camera may be a fixed optical lens system or have focusing and optical zooming capabilities.

The audio component 710 is configured to output and/or input an audio signal. For example, the audio component 710 includes a Microphone (MIC), and the MIC is configured to receive an external audio signal when the device 700 is in the operation mode, such as a call mode, a recording mode and a voice recognition mode. The received audio signal may be further stored in the memory 704 or sent through the communication component 716. In some embodiments, the audio component 710 further includes a speaker configured to output the audio signal.

The I/O interface 712 provides an interface between the processing component 702 and a peripheral interface module, and the peripheral interface module may be a keyboard, a click wheel, a button and the like. The button may include, but not limited to: a home button, a volume button, a starting button and a locking button.

The sensor component 714 includes one or more sensors configured to provide status assessment in various aspects for the device 700. For instance, the sensor component 714 may detect an on/off status of the device 700 and relative positioning of components, such as a display and small keyboard of the device 700, and the sensor component 714 may further detect a change in a position of the device 700 or a component of the device 700, presence or absence of contact between the user and the device 700, orientation or acceleration/deceleration of the device 700 and a change in temperature of the device 700. In general, the sensor component 714 may include a sensor configured to detect the presence of an object nearby without any physical contact. The sensor component 714 may also include a light sensor, such as a Complementary Metal Oxide Semiconductor (CMOS) or Charge Coupled Device (CCD) image sensor, configured for use in an imaging application. In some embodiments, the sensor component 714 may also include an acceleration sensor, a gyroscope sensor, a magnetic sensor, a pressure sensor or a temperature sensor.

In one non-limiting implementation, as shown in FIG. 7, the sensor component 714 may include at least a first sensor and a second sensor. The first sensor may include a proximity sensor, as well as a touchscreen, button, or other input sensor. Non-limiting examples of the first sensor can include capacitive, Doppler-effect, Hall-effect, eddy-current, inductive, magnetic, optical, or ultrasound sensors. The second sensor may include a fingerprint sensor. Non-limiting examples of the second sensor can include optical, ultrasonic, and capacitance sensors.

The communication component 716 is configured to facilitate wired or wireless communication between the device 700 and another device. The device 700 may access a communication-standard-based wireless network, such as a Wireless Fidelity (Wi-Fi) network, a 2nd-Generation (2G) or 3rd-Generation (3G) network or a combination thereof. In an exemplary embodiment, the communication component 716 receives a broadcast signal or broadcast associated information from an external broadcast management system through a broadcast channel. In an exemplary embodiment, the communication component 716 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and another technology.

In an exemplary embodiment, the device 700 may be implemented by one or more circuitries, which include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components. The device 700 may use the circuitries in combination with the other hardware or software components for performing the above described methods. Each module, sub-module, unit, or sub-unit in the disclosure may be implemented at least partially using the one or more circuitries.

In an exemplary embodiment, a non-transitory computer-readable storage medium including an instruction, such as the memory 704 including instructions, is provided. The instructions may be executed by the processor 720 of the device 700 to implement the abovementioned methods. For example, the non-transitory computer-readable storage medium may be a ROM, a Radom Access Memory (RAM), a Compact Disc Read-Only Memory (CD-ROM), a magnetic tape, a floppy disc, an optical data storage device and the like.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for controlling a fingerprint authentication on an electronic device, the method comprising:
   acquiring, using a first sensor on the electronic device, a first signal produced by an object positioned in proximity to the electronic device;
   acquiring a second signal using a fingerprint sensor on the electronic device;
   determining a strength of the first signal based on a sensed area of the first sensor that is activated by the object and a determined distance between the object and the electronic device;
   determining a strength of the second signal;
   controlling a fingerprint authentication on the electronic device based on the strength of the first signal and the strength of the second signal;
   controlling execution of a fingerprint unlocking function on the electronic device by comparing at least one of the strength of the first signal to a first preset threshold and the strength of the second signal to a second preset threshold; and
   executing the fingerprint unlocking function when at least one of the strength of the first signal is smaller than or equal to the first preset threshold and the strength of the second signal is larger than or equal to the second preset threshold.

2. The method of claim 1 further comprising controlling operation of a display screen on the electric device based on the comparison.

3. The method of claim 2 further comprising preventing activation of the display screen when at least one of the strength of the first signal is larger than the first preset threshold and the strength of the second signal is smaller than the second preset threshold.

4. The method of claim 2 further comprising activating the display screen when the strength of the first signal is smaller than or equal to the first preset threshold and the strength of the second signal is larger than or equal to the second preset threshold.

5. The method of claim 1 further comprising determining whether the second signal is a fingerprint signal by comparing voltage signals associated with the second signal with a preset fingerprint profile.

6. The method of claim 5 further comprising identifying a similarity between voltage signals associated with the second signal and voltage signals associated with at least one characteristic point in the preset fingerprint profile.

7. The method of claim 5 further comprising controlling the electronic device to enter an inadvertent touch rejection mode when the second signal is not a fingerprint signal, wherein under the inadvertent touch rejection mode, the electronic device is automatically avoided executing an operation in case of inadvertent touch.

8. An electronic device having a fingerprint authentication, the electronic device comprising:
   a first sensor configured to acquire signals from objects near the electronic device;
   a fingerprint sensor configured to acquire a user fingerprint;
   a processor programmed to execute instructions stored in a memory to:
      receive a first signal produced by an object near the electronic device and acquired using the first sensor;
      receive a second signal acquired using the fingerprint sensor on the electronic device;
      determine a strength of the first signal based on a sensed area of the first sensor that is activated by the object and a determined distance between the object and the electronic device;
      determine a strength of the second signal;
      control a fingerprint authentication on the electronic device based on the strength of the first signal and the strength of the second signal;
      control execution of a fingerprint unlocking function by comparing at least one of the strength of the first signal to a first preset threshold and the strength of the second signal to a second preset threshold; and
      execute the fingerprint unlocking function when at least one of the strength of the first signal is smaller than or equal to the first preset threshold and the strength of the second signal is larger than or equal to the second preset threshold.

9. The electronic device of claim 8, wherein the processor is further programmed to control operation of a display screen configured on the electric device based on the comparison.

10. The electronic device of claim 8, wherein the processor is further configured to determine whether the second signal is a fingerprint signal by comparing voltage signals associated with the second signal with a preset fingerprint profile.

11. The electronic device of claim 10, wherein the processor is further configured to identify a similarity between voltage signals associated with the second signal and voltage signals associated with at least one characteristic point in the preset fingerprint profile, and control the electronic device to enter an inadvertent touch rejection mode when the second signal is not a fingerprint signal, wherein under the inadvertent touch rejection mode, the electronic device is automatically avoided executing an operation in case of inadvertent touch.

12. A non-transitory computer-readable storage medium having stored therein instructions that, when executed by a processor, causes the processor to perform a method for controlling a fingerprint authentication, the method comprising:
   acquiring, using a first sensor on an electronic device, a first signal produced by an object positioned in proximity to the electronic device;
   acquiring a second signal using a fingerprint sensor on the electronic device;
   determining a strength of the first signal based on a sensed area of the first sensor that is activated by the object and a determined distance between the object and the electronic device;
   determining a strength of the second signal;
   controlling a fingerprint authentication on the electronic device based on the strength of the first signal and the strength of the second signal;
   controlling execution of a fingerprint unlocking function on the electronic device by comparing at least one of the strength of the first signal to a first preset threshold and the strength of the second signal to a second preset threshold; and
   executing the fingerprint unlocking function when at least one of the strength of the first signal is smaller than or equal to the first preset threshold and the strength of the second signal is larger than or equal to the second preset threshold.

13. The non-transitory computer-readable storage medium of claim 12, wherein the method further comprises controlling operation of a display screen on the electric device based on the comparison.

14. The method of claim 1 further comprising controlling the electronic device to change a fingerprint unlocking function from enabled to disabled upon the strength of the first signal is larger than a first preset threshold and upon the strength of the second signal is smaller than or equal to a second preset threshold.

15. The method of claim 1 further comprising controlling the electronic device to change a proximity sensing function of the first sensor from enabled to disabled upon the strength of the first signal is larger than a first preset threshold and upon the strength of the second signal is smaller than or equal to a second preset threshold.

* * * * *